E. K. AMES.
Domestic Boiler.

No. 86,488.             Patented Feb. 2, 1869.

Witnesses
W. E. Mans
H. Bowns

Inventor
Emily K. Ames

EMILY K. AMES, OF CHICAGO, ILLINOIS.

Letters Patent No. 86,488, dated February 2, 1869.

IMPROVEMENT IN CULINARY BOILERS.

The Schedule referred to in these Letters Patent and making part of the same.

*To all whom it may concern:*

Be it known that I, EMILY K. AMES, of Chicago, in the county of Cook, and State of Illinois, have invented a new and useful Improved Cooking-Utensil; and I do hereby declare and make known that the following is a full, clear, and exact description thereof, reference being had to the accompanying drawings, and the letters and figures marked thereon, which form part of this specification.

My said invention relates to a vessel or utensil designed for stewing oysters, fruit, or vegetables, and for other appropriate uses; and It consists in constructing the vessel with double walls, the fire being applied to the outer vessel, and the fruit, or other articles to be cooked, being placed in the inner vessel, the space between the two being filled with water, so as to cook the contents of the inner vessel thoroughly, and, at the same time, prevent the contents from being scorched or burned by the action of the heat.

My invention further consists in making the cover of the cooking-vessel with two walls, leaving a space between them, which communicates with the water-space of the utensil, so that the steam passes into said hollow cover, and thus entirely surrounds the inner vessel with water and steam, so as to cook the contents thoroughly and uniformly, as a uniform degree of heat would thus entirely surround the inner or cooking-vessel.

To enable those skilled in the art to understand how to construct and use my said improvement, I will describe the same with particularity, making reference, in so doing, to the aforesaid drawings, in which—

Similar letters of reference, in the different figures, denote the same parts of my said improvement.

B represents the exterior vessel, which may be manufactured expressly for this apparatus, or it may be any suitable and ordinary kettle or vessel, into which the interior arrangements, hereinafter described, may be fitted, as shown; and, when said exterior vessel is made expressly for this utensil, the inner vessel may be arranged therewith, removably, as shown, or it may be permanently attached, as desired.

Figure 1:
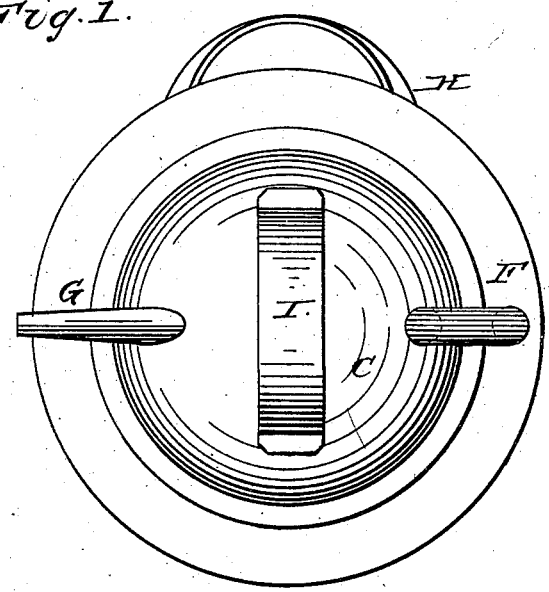
Figure 1 represents a plan or top view of my invention.
Figure 2:
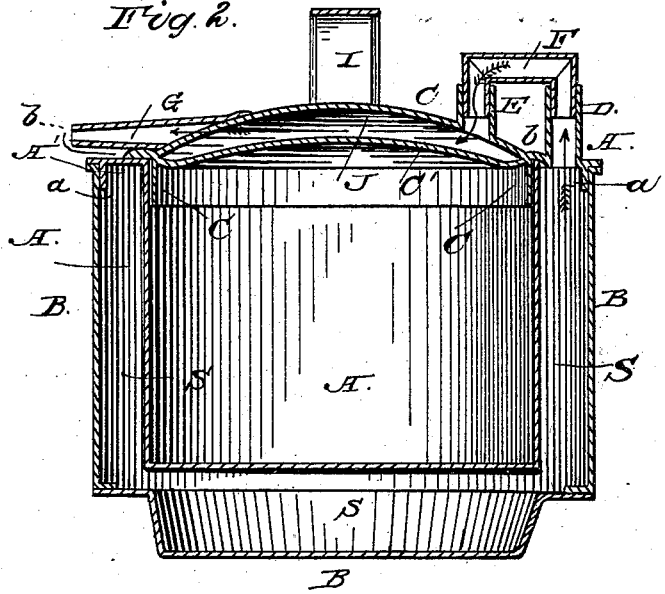
Figure 2 is a vertical central section of the same.

The inner vessel, A, is made shallower, and of less diameter, than the exterior vessel, so as to leave a space beneath and around said inner vessel A, as indicated by S in fig. 2.

Around the top of said vessel A is an annular flange, of suitable width, marked A', which rests upon the top of the vessel B, as shown, and has a vertical flange, a, which fits snugly down inside of said vessel B, to retain the two firmly together, as clearly seen in fig. 2.

The cover is made of two circular plates, C C', their circumferences being secured together, so as to leave a space, J, between, as seen in said fig. 2, said cover having a horizontal flange, b, resting upon the top of the flange A' of the inner vessel, and also a vertical flange, c, which fits within the inner vessel, as shown.

H H represent handles, whereby the utensil can be taken and carried from place to place, or put on or taken off the stove, I being the cover-handle, whereby that can be put on or removed, as desired.

D represents a short vertical tube, opening out from the space S, through the flange A'; or it may connect with the upper part of said space S in any other suitable manner.

E is a similar tube, opening into the space J in the cover, near the side of the cover, so that, when the cover is placed on the utensil, with the tube E contiguous to the tube D, an elbow-tube, F, can be placed upon said tubes, fitting tightly as necessary, so as to form a communication between the space S and the space J, to permit the steam to pervade the space J, and cause the top of the vessel A to be heated, as well as the bottom and sides, G representing a tube, through which the steam passes out, as indicated by the arrows.

In using this apparatus, the space S is filled or nearly filled with water, the fruit or other articles to be cooked are placed in the chamber A, and the cover and tubes arranged as shown, when the utensil is placed upon the stove in the ordinary manner; the water in the space S boiling, and the steam passing into and filling the cover, as described, and thus hastening and facilitating the cooking, the contents of the vessel A being rapidly and nicely cooked, without burning.

It may be observed that, by leaving off the elbow F, and allowing the steam to pass off out of the tube D, the apparatus would operate on the same principle, and in the same manner, with the exception of heating the cover; but I prefer to have the said elbow arranged as shown.

The apparatus may be circular, or of any other suitable form.

The water is put into the space S through the tube D, while the elbow F is removed.

Having described the construction and operation of my invention, I will specify what I claim, and desire to secure by Letters Patent.

1. I claim the combination of the exterior vessel, B, and the inner vessel, A, having a flange, A', and a vertical circular flange, a, arranged to operate substantially as specified.

2. I claim the combination of the vessels A B, the double cover C C', and the pipes D E F, or their equivalent, substantially as herein described.

EMILY K. AMES.

Witnesses:
W. E. MARRS,
H. BRUNS.